United States Patent [19]

Egner-Walter et al.

[11] Patent Number: 5,247,728
[45] Date of Patent: Sep. 28, 1993

[54] DEVICE FOR MOUNTING A WIPER SYSTEM

[75] Inventors: Bruno Egner-Walter, Heilbronn; Jiri Mach, Leutenbach; Hans Prohaska, Bietigheim-Bissingen, all of Fed. Rep. of Germany

[73] Assignee: SWF Auto-Electric GmbH, Fed. Rep. of Germany

[21] Appl. No.: 720,492

[22] PCT Filed: Oct. 19, 1990

[86] PCT No.: PCT/EP90/01775
§ 371 Date: Jul. 15, 1991
§ 102(e) Date: Jul. 15, 1991

[87] PCT Pub. No.: WO91/06450
PCT Pub. Date: May 16, 1991

[30] Foreign Application Priority Data

Oct. 25, 1989 [DE] Fed. Rep. of Germany ....... 3935465

[51] Int. Cl.⁵ .......................... B25B 27/14; B60S 1/08
[52] U.S. Cl. ........................... 29/281.1; 269/45; 269/230
[58] Field of Search .............. 29/244, 281.1, 434, 29/453, 525; 254/DIG. 4; 269/45, 59, 71, 230

[56] References Cited

U.S. PATENT DOCUMENTS

| | | | |
|---|---|---|---|
| 745,299 | 11/1903 | Smith | 269/45 X |
| 4,253,649 | 3/1981 | Hewson | 269/45 |
| 4,519,123 | 5/1985 | Imayoshi | 29/434 |
| 4,624,451 | 11/1986 | Mortoly | 269/71 |

Primary Examiner—Timothy V. Eley
Attorney, Agent, or Firm—Robert P. Seitter; J. Gordon Lewis

[57] ABSTRACT

A method and a device for mounting a wiper system on a motor vehicle includes individual structural members of the wiper system fitted in places on the motor vehicle body which are remote from each other. Thereby the individual structural members (19) are at first secured to a device serving as a transportation support (30) in proper position to the fastening points (26) on the motor vehicle body (25) and the premounted unit of wiper system and transportation support (30) is then put on the vehicle body (25) in proper mounting condition and thereafter the connection between the structural members (19) of the wiper system and the transportation support (30) is released again.

7 Claims, 2 Drawing Sheets

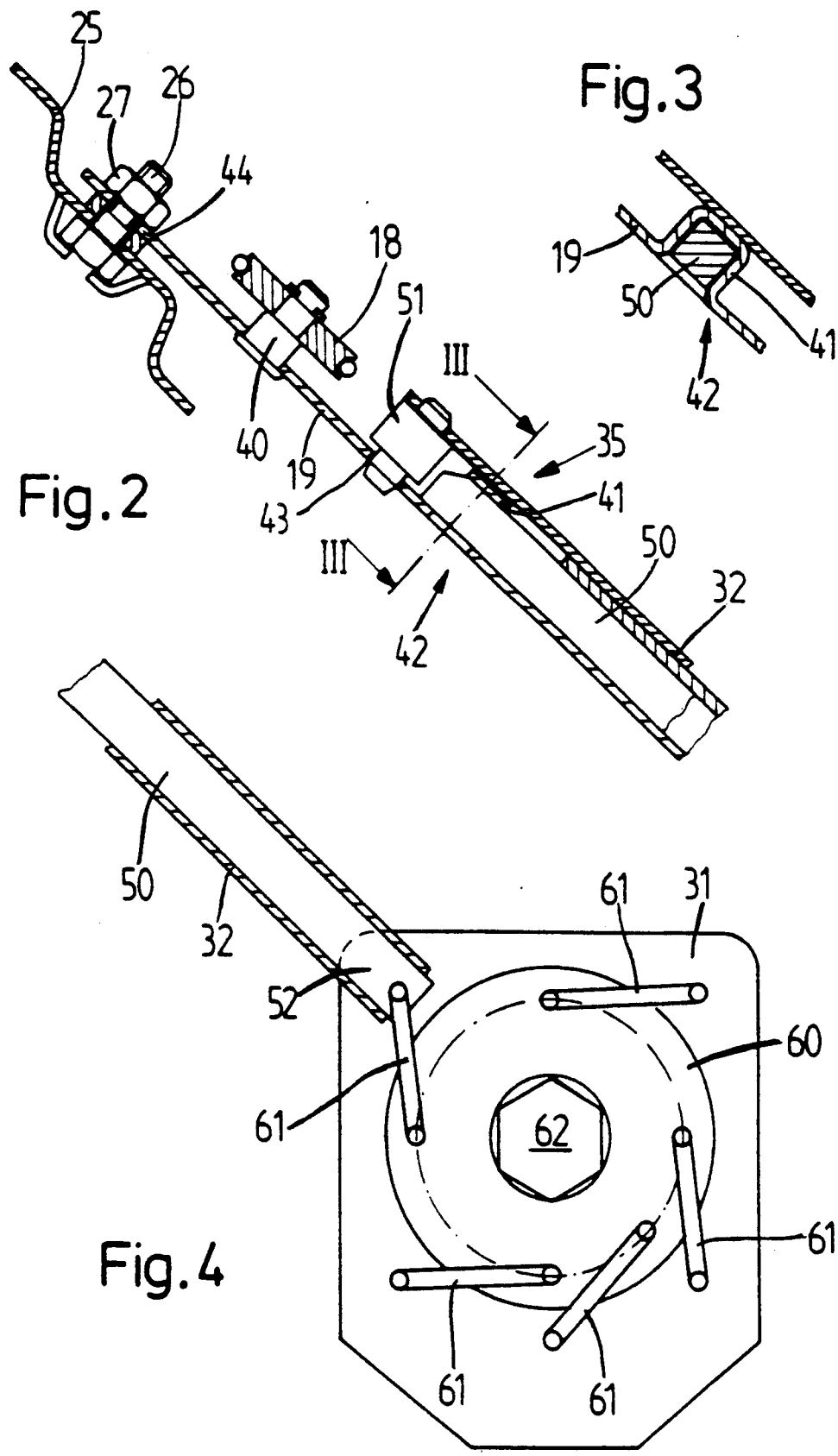

DEVICE FOR MOUNTING A WIPER SYSTEM

INTRODUCTION

The present invention relates to a method and a device for mounting a wiper system on a motor vehicle.

BACKGROUND OF THE INVENTION

In wiper systems, the drive motor and the bearings for the wiper shafts are fixed on a supporting frame. Drive linkage members extending from the driven crank of the motor to the wiper shafts swivellably mounted in the bearing bushes are hung in in working condition. In some cases, the 10 manufacturer of the wiper systems has mounted the wiper arm-and-blade assembly on the wiper shafts, so that the motor vehicle manufacturer is supplied with a fully operational structural member which can be mounted without time-consuming efforts. A wiper system of this kind has been described in the German laid open print 2 056 672.

In addition, wiper systems are also available which are in working condition only after the assembly of individual elements on a motor vehicle. Thus, the wiper system manufacturer supplies the bearing bushes with inserted wiper shafts and the drive motor as well as the linkages of piece parts to the motor vehicle manufacturer, who has to secure or to mount these piece parts in separate working steps on the vehicle body. In this case the amount of work to be done by the motor vehicle manufacturer is much bigger On the other hand, an additional supporting frame can be omitted in this system, which frame is replaced by the vehicle body.

Combinations of the two above described systems are available wherein the wiper motor can be premounted with a bearing bush to form a structural member and can be supplied to the motor vehicle manufacturer together with the other bearing bush arrangements and one articulated rod. A system of this kind has been described by the German patent application 2 529 949 published for opposition.

Wiper systems are also available in which the wiper blade is translationally moved across a windshield. In wiper systems of this kind guide elements for guiding the wiper blade have to be secured on the border of the windshield. If cables are used for driving the windshield wiper, idler rolls are necessary in the corner areas of the windshield. In this case, the cable is arranged in a guide tube which is also held on the motor vehicle body. In particular, this very system is composed of many structural members which have to be mounted in places of a motor vehicle body which are far away from each other. Hereby fastening areas are concerned which offer only a relatively small mounting space, so that the use of a supporting frame according to the principle of the first mentioned wiper system is practically not possible in these constructions. Until now it has been necessary to mount these structural members separately.

BRIEF DESCRIPTION OF THE INVENTION

The present invention is based on the problem of simplifying the method for mounting such wiper systems and providing in addition a suitable device for this purpose.

According to the invention this problem is solved by the characterizing features of claim 1.

The invention is substantially based on the finding that a premounted structural unit can be supplied to the motor vehicle manufacturer without substantial cost increase wherein the body itself takes over the function of the supporting frame. If individual structural members of the wiper system are at first secured onto a transportation support in proper position relative to the fastening points on the motor vehicle body on which they are to be fastened later on, whereby this premounted unit of wiper system and transportation support are put onto the body of the motor vehicle in proper mounting position and the connection between the individual structural members of the wiper system and the transportation support are detached again. The transportation support can thereafter be returned to the manufacturer of the wiper system for the next mounting process.

Thereby the assembly is effected in such a way that the connection between the various structural members and the transportation support is only detached, when these structural members of the wiper system are fixed on the motor vehicle body in working condition. This means indeed that all structural members can already be properly adjusted at the manufacturer of the wiper system and this correct adjustment is then without any faults applied to the body of the vehicle at the motor vehicle manufacturer because of the rigid connection through the transportation support. Thus a function test of the wiper system carried out at the wiper system manufacturer has not to be necessarily repeated at the motor vehicle manufacturer, so that assembly costs for the manufacture of the motor vehicle can be saved.

This last-mentioned advantage is in particular important, if a wiper system with a wiper translationally movable by a cable-operated drive is concerned. In embodiments of this kind the clamping element connecting the cable ends are already prestressed to the right value.

A particularly exact mounting is achieved, if the structural members of the wiper system are at first fixed to a vehicle body serving as a gauge at the manufacturer of the wiper system. The various structural members are adjusted exactly and thereafter fixed on the transportation support. When the various structural members have been demounted from this vehicle body gauge the transportation support with the structural members fixed thereon is then forwarded to the motor vehicle manufacturer. Thus the device for mounting a wiper system according to this mounting method consists of a transportation support, in which fastening arms extend from a central body which fastening arms have each a grap for the structural member. Each grap has clamping or locking means or, in a preferred embodiment, latches actuating in a form-fit way, via which the structural members can be fixed on the transportation support in a relatively short time in exact position relative to each other. These latches can thereby be separately displaceable, however the mounting is essentially facilitated, if alongside fastening arms means for transmission of motion are arranged from the latches to the central body and an actuator is mounted on the latter, through which can be preferably displaced all latches together and in the same sense.

DESCRIPTION OF THE INVENTION

The invention and further advantageous embodiments are described below in detail by way of the embodiment shown in the accompanying drawing in which:

FIG. 2, is a section taken on the line II—II in FIG. 1;

FIG. 3, is a detailed section taken on the line III—III in FIG. 2; and

FIG. 4, is a schematic view of an adjusting mechanism on the central body of the transportation support.

DETAILED DESCRIPTION OF THE PREFERRED EMBODIMENT OF THE INVENTION

Figure 1:
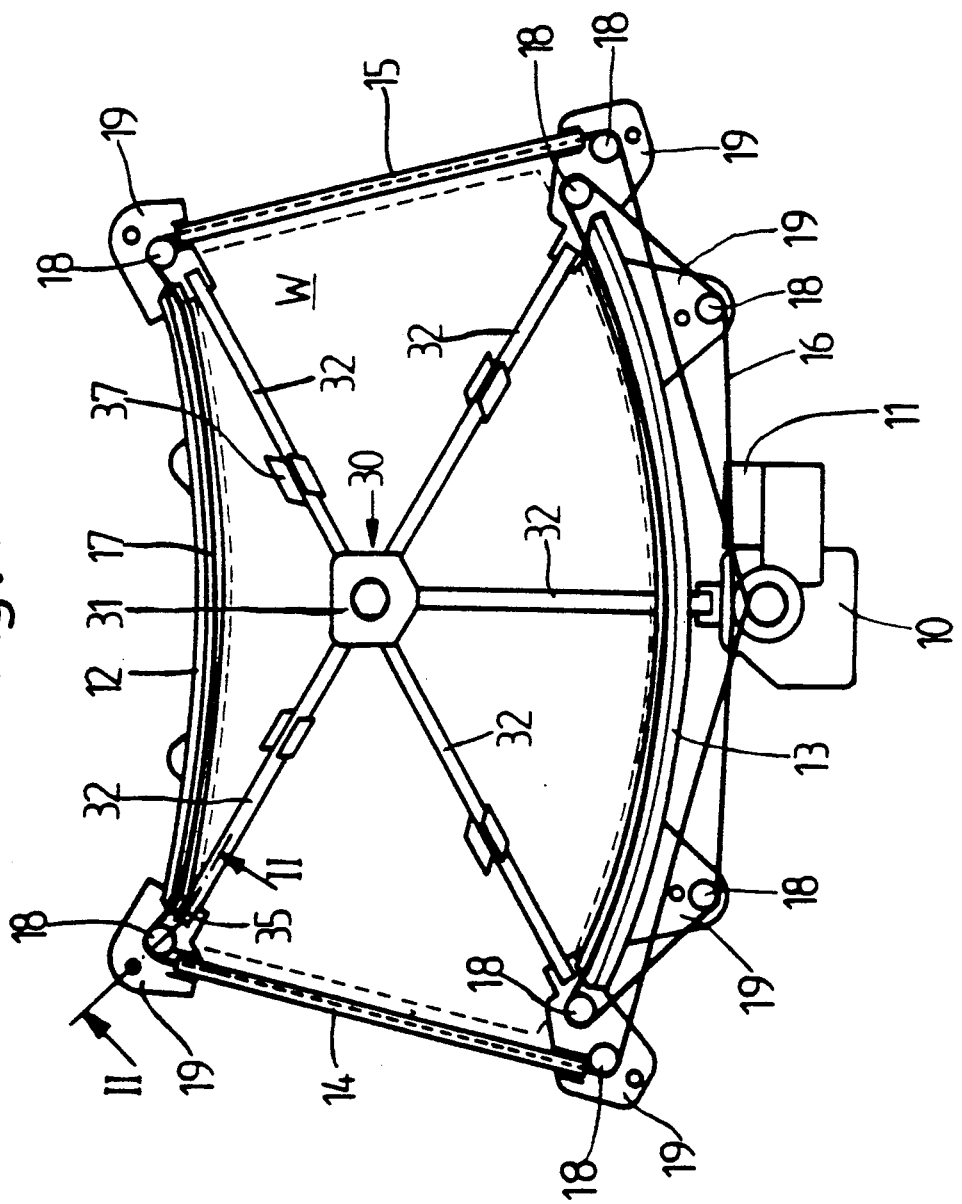
FIG. 1, is a schematic view of a cable-operated windshield wiper system the structural members of which are secured on a transportation support.

Reference to FIG. 1, the contour of a windshield W is shown by broken lines which is to be cleaned by a wiper system. Part of this wiper system is a wiper motor 10 with a module 11 mounted thereon including an electronic circuit for controlling the wiper operation. In the direct vicinity of the substantially horizontally aligned borders of the windshield, two guide rails 12 and 13 are arranged. In the vicinity of the nearly perpendicularly extending windshield borders a guide tube 14, 15 each is arranged. As a drive element for the windshield wiper not shown in detail cables 16 and 17 are provided, which are arranged alongside the guide rails 12, 13 and within the guide tubes 14, 15 and run over idle rolls 18, which are movably mounted on a plate-shaped holder 19. In FIG. 1 one recognizes four holders 19 of this kind in the corner areas of the windshield W. Two additional holders 19 are preferably integrally fixed on the lower guide rail 13. In this connection it is pointed out that the guide rails 12, 13, the guide tubes 14, 15 and the holders 19 can be fitted to form a structural member, that means the guide rails and the guide tubes can at their ends be connected with the associated holders. However, a transportable structural member is not created thereby, because the guide tube is normally made of weight-saving synthetic material and because of the size of such systems a satisfactory torsional stiffness which also endures a heavily tensioned cable is not ensured.

In FIG. 1 a transportation support is designated 30, which comprises a central body 31 and a total of five fastening arms 32 radially projecting from the central body. The fastening arms 32 lead to the holders 19 with the idle rolls 18 in the corner areas of the windshield as well as to the wiper motor 10. All fastening arms 32 have graps 35 on their ends not facing the central body for the holders 19 or a sheet metal support of the wiper motor 10. These graps are illustrated later on by way of FIGS. 2 and 3 of the drawing. It is important for the present invention that the transportation support 30 formed in the manner of a spider has a satisfactory stiffness and that on the fastening arms 32 individual structural members, thus for example the holder 19, can be secured detachably and in proper position to the fastening points of the motor vehicle body. In FIG. 1 distance holders 37 are also indicated on which a second transportation support can be received. Thus the distance holders make possible a stacking of several pre-mounted units consisting of wiper system and transportation support.

It has to be mentioned with respect to FIG. 1 that the fastening arms 32 have a curvature adapted to the windshield. Thus it can be ensured that, when the wiper system is mounted with inserted windshield, the windshield is not damaged.

FIG. 2 shows a schematic view of the end of a fastening arm 32 with a grap 35. The holder 19 shown is formed of a sheet metal strip on which a guide roll is rotably mounted via a pin 40. A web 41 is cut out from the sheet metal strip and bent in the manner of a U as is shown in FIG. 3. Thus a holding recess 42 is formed. The holder 19 has furthermore a centering bore 43. Closely to the free end an aperture 44 is worked into the holder 19, through which projects a fastening pin 26 fitted on the vehicle body 25 and the fastening point on the vehicle body on the free end of which fastening pin a fastening nut 27 is screwed. The fastening arms 32 are formed as tubes from the free end of which a latch 50 projects which can fittingly engage in the holding recess 42. On the free ends of the fastening arms 32 a centering pin 51 is also secured which can fittingly engage in the centering bore 43 of the holder 19.

FIG. 2 shows the mounting condition after the individual structural members have been fitted on the body of a motor vehicle. One can see from FIG. 2 that by the co-operation of the centering pin, centering bore as well as the latch and holding recess, a properly positioned form-fit, detachable connection is provided between holder 19 and fastening arms 32. When the fastening nut 27 is tightened the said form-fit connection between the holder and the fastening arms 32 can again be detached, as it will be described later on.

In FIG. 4 a central body 31 and a fastening arm 32 can be recognized, whereby a construction is conceived in which the fastening arm 32 has no curvature. Then the latch 50, stiffening the design, can reach as far as to the other end of the fastening arms 32. On the central body 31 is swivellably mounted a wheel 60 serving as an actuator on which a push rod 61 is articulated which acts upon the end 52 of the latch 50. If the wheel 60 is turned in clockwise direction the latch 50 is brought from the unlocked position shown in FIG. 4 into its locking position as shown in FIG. 2. The locking position is reached, if the push rod 61 extends in the longitudinal direction of the latch 50. Then the wheel is secured on the central body in a manner protected against twisting, e.g., is braced with it by means of a screw connection 62. Thus, with regard to the construction according to FIG. 4, that the displacement of a latch 50 through a suitable gearing, in which the push rod 61 is included, is derived from a rotation of a wheel 60 mounted on the central body. This wheel serves as an actuator. In FIG. 4 further push rods are to be mounted on the wheel 60, through which the other latches not shown on grounds of clearness can be displaced. Thus all latches are to be operated in the same sense by the actuator on the central body 31, so that the amount of work for a fixation of all structural members on the transportation support and the release of the transportation support from the wiper system installed in the motor vehicle is possible in very little time. In constructions with curved fastening arms other elements than latches could be used for transmission of motion, for example Bowden cables.

The method for mounting the wiper system is carried out as follows:

At first all structural members, through the holders 19, are secured in the corner areas of the vehicle body to serve as a gauge. Thereby the function of the system can be examined and in a cable-operated system a clamping element not shown in detail can possibly be readjusted. Then the various structural members, thus the holders 19, are detachably fixed on the transportation support 30. They are then already secured in proper position to the fastening points on the motor vehicle body. The premounted unit of wiper system and transportation support is then put on the body of the motor vehicle, the fastening pins 26 thereby engaging in aperture 44. Then these individual structural members of the wiper system are anchored on the vehicle body in a dimensionally stable way. Only thereafter the connection between the various structural members and the transportation support is released in one work step. The transportation support is then returned to the manufacturer of the wiper systems.

WHAT IS CLAIMED IS:

1. A device for mounting a wiper system, said wiper system including several individual structural members which are adapted to be attached to spaced places on a vehicle body, said device having dimensionally stable fastening arms having opposed ends, each arm having one end fastened to a central body such that said arm extends from said central body, the opposite end of said fastening arm comprising a gap for releasably engaging a structural member;

each gap comprising a displaceable latch which engages a retaining means on said structural member in a dimensionally stable manner.

2. A device according to claim 1, wherein each grap comprises a centering device for positioning the structural member.

3. A device according to claim 1, wherein the fastening arms are bent to be adapted to a windshield to be cleaned.

4. A device according to claim 1, wherein means for transmission of motion are arranged adjacent the fastening arms, said means displacing said latch with respect to said central body.

5. A device according to claim 2, wherein on the central body an actuator is adjustably mounted and all latches are displaceable in the same sense by actuating the said actuator.

6. A device according to claim 5, wherein the displacement of the latches is affected by the rotation of a wheel rotatably mounted on the central body.

7. A device according to claim 1, wherein spacers are attached on the central body and on the fastening arms for stacking several devices in proper position, said device consisting of a wiper system and a transportation support.

* * * * *